US008320013B2

(12) United States Patent
Mongeon et al.

(10) Patent No.: US 8,320,013 B2
(45) Date of Patent: Nov. 27, 2012

(54) SYNCHRONIZATION OF VARIATION WITHIN COMPONENTS TO REDUCE PERCEPTIBLE IMAGE QUALITY DEFECTS

(75) Inventors: Michael C. Mongeon, Walworth, NY (US); Mark Sennett Jackson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 567 days.

(21) Appl. No.: 12/549,129

(22) Filed: Aug. 27, 2009

(65) Prior Publication Data

US 2011/0051170 A1 Mar. 3, 2011

(51) Int. Cl.
*G06K 15/00* (2006.01)
*G06T 5/00* (2006.01)

(52) U.S. Cl. ....... 358/1.18; 358/1.9; 358/3.26; 358/406; 382/112; 356/392; 399/15; 399/49

(58) Field of Classification Search .................. 713/501; 358/1.18, 1.9, 3.26, 406; 356/392; 399/15, 399/49
See application file for complete search history.

(56) References Cited

U.S. PATENT DOCUMENTS

| | | | |
|---|---|---|---|
| 3,818,297 A | 6/1974 | Ha et al. | |
| 4,611,901 A | 9/1986 | Kohyama et al. | |
| 4,660,059 A | 4/1987 | O'Brien | |
| 4,833,503 A | 5/1989 | Snelling | |
| 5,138,564 A | 8/1992 | De Jong et al. | |
| 5,206,645 A | 4/1993 | Urich | |
| 5,278,589 A | 1/1994 | Wong | |
| 5,302,973 A | 4/1994 | Costanza et al. | |
| 5,365,074 A | 11/1994 | Genovese | |
| 5,381,165 A * | 1/1995 | Lofthus et al. | 347/232 |
| 5,438,354 A | 8/1995 | Genovese | |
| 5,519,514 A | 5/1996 | TeWinkle | |
| 5,550,653 A | 8/1996 | TeWinkle | |
| 6,121,992 A | 9/2000 | Girmay | |
| 6,219,516 B1 | 4/2001 | Furst et al. | |
| 6,356,718 B1 * | 3/2002 | Matsumoto | 399/40 |
| 6,369,842 B1 | 4/2002 | Abramsohn | |
| 6,462,821 B1 | 10/2002 | Borton et al. | |
| 6,567,170 B2 | 5/2003 | Tandon et al. | |
| 6,621,576 B2 | 9/2003 | Tandon et al. | |
| 6,635,864 B2 * | 10/2003 | Hirst | 250/234 |
| 6,904,255 B2 | 6/2005 | Kera et al. | |
| 6,975,949 B2 | 12/2005 | Mestha et al. | |
| 7,024,152 B2 | 4/2006 | Lofthus et al. | |
| 7,054,568 B2 | 5/2006 | Mizes et al. | |
| 7,058,325 B2 | 6/2006 | Hamby et al. | |

(Continued)

OTHER PUBLICATIONS

Michael C. Mongeon, U.S. Appl. No. 12/261,312, filed Oct. 30, 2008.

(Continued)

*Primary Examiner* — Twyler Haskins
*Assistant Examiner* — Dennis Dicker
(74) *Attorney, Agent, or Firm* — Pillsbury Winthrop Shaw Pittman, LLP

(57) ABSTRACT

A method and system for synchronizing variations in components or subsystems in an image printing system is provided. The method includes identifying a plurality of image quality defects printed by the image printing system by a controller, said image quality defects each occurring with an associated frequency and each being associated with a component or subsystem of the image printing system; determining a phase difference of the image quality defects by the controller; and adjusting operation of each component or subsystem associated with the image quality defects, such that image quality defects are in phase.

25 Claims, 11 Drawing Sheets

U.S. PATENT DOCUMENTS 7,136,616 B2 * 11/2006 Mandel et al. ................ 399/388
7,177,585 B2 2/2007 Matsuzaka et al.
7,492,381 B2 2/2009 Mizes et al.
7,542,171 B2 * 6/2009 Viassolo et al. ............. 358/3.26
7,564,475 B1 * 7/2009 Mizes ........................... 347/253
7,697,142 B2 * 4/2010 Ossman et al. ............... 356/445
7,952,761 B2 * 5/2011 Paul et al. ...................... 358/1.9
7,980,654 B2 * 7/2011 Mongeon et al. ............... 347/19
8,073,378 B2 * 12/2011 Calamita et al. .............. 399/394
8,213,816 B2 * 7/2012 Kozitsky et al. ................ 399/48
8,223,385 B2 * 7/2012 Minhas ........................ 358/1.18
2005/0196187 A1 * 9/2005 Mizes et al. .................... 399/49
2006/0001911 A1 * 1/2006 Viassolo et al. ............. 358/3.26
2006/0114308 A1 6/2006 Mizes et al.
2007/0052991 A1 3/2007 Goodman et al.
2007/0236747 A1 10/2007 Paul
2009/0002724 A1 1/2009 Paul et al.

OTHER PUBLICATIONS

Michael C. Mongeon, U.S. Appl. No. 11/962,568, filed Dec. 21, 2007.

Aaron M. Burry, U.S. Appl. No. 12/391,888, filed Feb. 23, 2009.

* cited by examiner

SYNCHRONIZATION OF VARIATION WITHIN COMPONENTS TO REDUCE PERCEPTIBLE IMAGE QUALITY DEFECTS

FIELD

The present disclosure relates to a method and system for synchronizing variation within components and/or subsystems to reduce perceptible image quality defects in image printing systems.

BACKGROUND

Perceptible image quality defects, or non-uniformities, can be caused by variations within various components and/or subsystems in image printing systems. For example, a common image quality defect is that of banding. Banding generally refers to periodic defects on an image caused by a one-dimensional density variation in the process (slow scan) directions. An example of this kind of image quality defect, periodic banding, is illustrated in FIG. 1. FIG. 1 shows two periodic bands, band 1 and band 2, in an output print 3. Bands can result due to many different types of variations within components and/or subsystems, such as developer run out (variations in roll or drum diameter) in the developer roll or photoreceptor drum, wobble in the polygon mirror of the laser raster optical scanner (ROS), and the like.

While requiring tight tolerances for all components and/or subsystems, for example rotational components such as ROS rotating polygons and developer rolls, may reduce such perceptible image quality defects, tight tolerances often raise unit manufacturing costs and do not guarantee adequately uniform prints.

SUMMARY

According to one aspect of the present disclosure, a method for synchronizing variations in components or subsystems in an image printing system is provided. The method includes identifying a plurality of image quality defects printed by the image printing system by a controller, said image quality defects each occurring with an associated frequency and each being associated with a component or subsystem of the image printing system; determining a phase difference of the image quality defects by the controller; and adjusting operation of each component or subsystem associated with the image quality defects, such that image quality defects are in phase.

According to another aspect of the present disclosure, a system for synchronizing variation in components or subsystems in an image printing system is provided. The system includes an image bearing surface; a marking engine configured to generate an image to be formed on the image bearing surface; a sensor configured to sense images on the image bearing surface; and a controller. The controller is configured to identify a plurality of image quality defects printed by the image printing system by a controller, said image quality defects each occurring with an associated frequency and each being associated with a component or subsystem of the image printing system; determine a phase difference of the image quality defects by the controller; and adjust operation of each component or subsystem associated with the image quality defects, such that image quality defects are in phase.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure addresses the issue of perceptible image quality defects occurring with an associated frequency and being associated with variations within components and/or subsystems in an image printing system. The present disclosure proposes a method and system for synchronizing variations in components and/or subsystems such that the image quality defects associated with the components and/or subsystems are in phase. The image quality defects may be considered "in phase" when they overlap at least once per cycle.

The present disclosure proposes a solution comprising at least three steps. In the first step, a plurality of image defects, such as bands, are identified, for example, by a controller. In the second step, the phase difference between the image quality defects is determined by the controller. In the third step, the components or subsystems causing the image quality defects are synchronized by the controller such that image quality defects are in phase.

Figure 2:
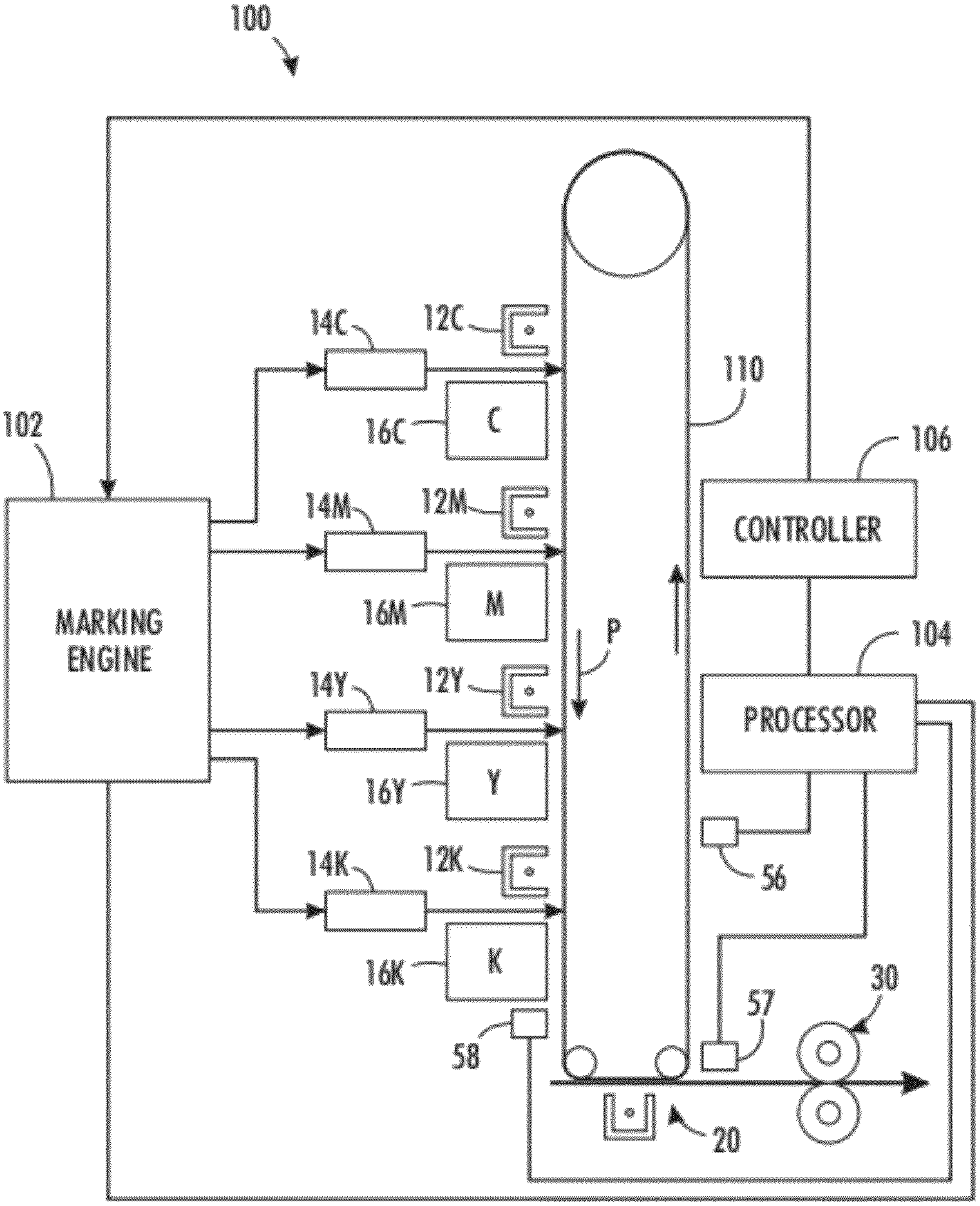
FIG. 2 illustrates a schematic perspective view of an image printing system.

FIG. 2 illustrates a schematic perspective view of an image printing system 100 in accordance with an embodiment. Specifically, there is shown an "image-on-image" xerographic color image printing system, in which successive primary-color images are accumulated on an image bearing surface 10 (e.g., a photoreceptor belt). This particular type of printing is also referred as "single pass" multiple exposure color printing. In one implementation, the Xerox Corporation iGen3® or iGen4® digital printing press may be utilized. However, the present disclosure is not limited to an image-on-image xerographic color image printing system. It is appreciated that any image printing machine, including machines that print on photosensitive substrates, xerographic machines with multiple photoreceptors, or ink-jet-based machines, may utilize the present disclosure as well. The system may also be used in analog and digital copiers, scanners, facsimiles, or multifunction machines. The image bearing surface 10 may have photoreceptor registration markings (not shown), as disclosed in U.S. Pat. No. 6,369,842, herein incorporated by reference in its entirety.

Figure 9:
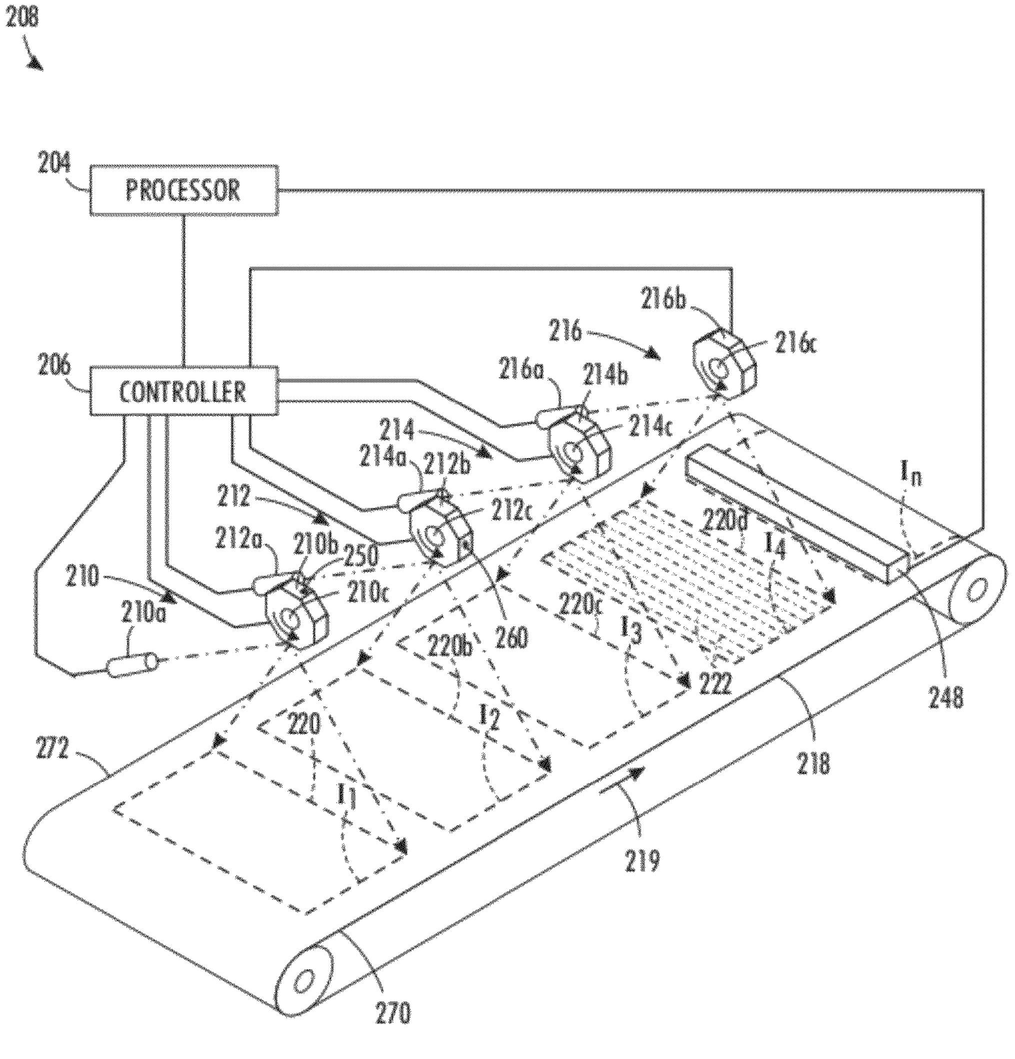
FIG. 9 illustrates an image printing system incorporating a system for synchronizing variations in rotating polygons.

The image printing system 100 typically uses one or more Raster Output Scanners (ROS) (for example, see 210, 212, 214, and 216 as shown in FIG. 9) to expose the charged portions of the image bearing surface 10 to record an electrostatic latent image on the image bearing surface 10. Further examples and details of such image on image printing systems are described in U.S. Pat. Nos. 4,660,059; 4,833,503; and 4,611,901, each of which herein is incorporated by reference in its entirety. U.S. Pat. No. 5,438,354, the entirety of which is incorporated herein by reference, provides one example of a Raster Output Scanner (ROS) system.

However, it should be appreciated that the present disclosure could also be employed in non-xerographic color printing systems, such as ink jet printing systems. The present disclosure could also be employed in "tandem" xerographic, tightly integrated parallel printing (TIPP), or other color printing systems, typically having plural print engines transferring respective colors sequentially to an intermediate image transfer belt and then to the final substrate. Thus, for a tandem color printer (e.g., U.S. Pat. Nos. 5,278,589; 5,365,074; 6,219,516; 6,904,255; and 7,177,585, each of which herein is incorporated by reference in its entirety) or a TIPP system (e.g. U.S. Pat. Nos. 7,024,152 and 7,136,616, each of which herein is incorporated by reference in its entirety) it will be appreciated that the image bearing surface may be either or both on the photoreceptors and the intermediate transfer belt, and have sensors and image position correction systems appropriately associated therewith. Various such known types of color image printing systems are further described in the above-cited patents and need not be further discussed herein.

In one embodiment, the image bearing surface 10 is at least one of a photoreceptor drum, a photoreceptor belt, an intermediate transfer belt, an intermediate transfer drum, and other image bearing surfaces. That is, the term image bearing surface 10 means any surface on which an image is received, and this may be an intermediate surface (i.e., a drum or belt on which an image is formed prior to transfer to a printed document).

The system 100 includes a marking engine 102, a processor 104, and a controller 106. The marking engine 102 is configured to mark an image on the image bearing surface 10 moving in a process direction. For example, see U.S. patent Ser. No. 12/391,888 filed on Feb. 23, 2009, herein incorporated by reference in its entirety. In one embodiment, the image marked with the marking engine on the image bearing surface 10 is a toner image. A series of stations are disposed along the image bearing surface 10, as is generally familiar in the art of xerography, where one set of stations is used for each primary color to be printed (e.g. C, M, Y, K). The processor 104 is configured to generate a reflectance profile of the image by based on the sensed reflectance of the image in a process and/or cross-process direction. The controller 106 is configured to adjust the position and/or rotational velocity of rotating developers 36C, 36M, 36Y, and 36K (shown in FIG. 3A).

While reference to sensing a reflectance characteristic is disclosed herein, it should be appreciated that other optical characteristics may also be sensed and used in conjunction with the disclosed embodiments. For example, in one embodiment, a transmissive sensor may be used for measuring the density of a colorant on the image bearing surface. Rather than applying a light source onto a substrate and measuring the light that is reflected to the sensor, the transmissive sensor would receive light applied from a light source on the other side of the image bearing surface. Light would then pass through the substrate, through the colorant, and finally on to the sensor. The amount of light that reaches the sensor would by effected by the density of the colorant. Of course, this requires an image bearing surface that is amenable to transmission mode. The sensed transmission data would be used in the same basic fashion with the rest of the compensation approach using reflectance data. Indeed, the methodology disclosed herein is essentially the same, independent of the specific sensing mode implemented.

In one embodiment, the image may be applied on the image bearing surface 10 by one or more lasers such as 14C, 14M, 14Y, and 14K. As should be appreciated by one skilled in the art by coordinating the modulation of the various lasers such as 14C, 14M, 14Y, and 14K with the motion of the image bearing surface 10 and other hardware, the lasers discharge areas on the image bearing surface 10 to create exposed negative areas before these areas are developed by their respective developer units 16C, 16M, 16Y, 16K.

For example, to place a cyan color separation image on the image bearing surface 10, there is used a charge corotron 12C, an imaging laser 14C, and a developer unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of the image bearing surface 10, and then the image is transferred from the image bearing surface 10 (e.g., at transfer station 20) to the document to form a printed image on the document. The output document is then run through a fuser 30, as is familiar in xerography.

The system 100 includes sensors 56, 57 and 58 that are configured to provide feedback (e.g., reflectance of the image in the process and/or cross-process direction) to the processor 104. The sensors 56, 57 and 58 are configured to scan images created on the image bearing surface 10 and/or to scan test patterns. Sensor 57 is configured to scan image created in output prints, including paper prints. Sensors 56, 57 and/or 58 may also include a spectrophotometer, color sensors, or color sensing systems. For example, see U.S. Pat. Nos. 6,567,170; 6,621,576; 5,519,514; and 5,550,653, each of which herein is incorporated by reference in its entirety. In an embodiment, the sensors 56, 57 and/or 58 may be placed just before or just after the transfer station 20 where the toner is transferred to the document. It should be appreciated that any number of sensors may be provided, and may be placed anywhere in the image printing system as needed, not just in the locations illustrated.

Preferably, the sensors may include, for example, a full width array (FWA) sensor. A full width array sensor is a sensor that extends substantially an entire width (e.g., cross-process direction) of the moving image bearing surface. In one embodiment, the FWA sensor may be positioned in the cross-process direction adjacent the image bearing surface. In one embodiment, the FWA sensor may be configured to detect any desired part of the printed image. The FWA sensor may include a plurality of sensors equally spaced at intervals (e.g., every 1/600th inch (600 spots per inch)) in the cross-process (or a fast scan) direction. See for example, U.S. Pat. No. 6,975,949, herein incorporated by reference in its entirety. It is understood that other linear array sensors may also be used, such as contact image sensors, CMOS array sensors or CCD array sensors. Although the FWA sensor or contact sensor is shown in the illustrated embodiment, it is contemplated that the present disclosure may use sensor chips that are significantly smaller than the width of the image bearing surface, through the use of reductive optics. In one embodiment, the sensor chips may be in the form of an array that is one or two inches long and that manages to detect the entire area across the image bearing surface through reductive optics. In one embodiment, a processor may be provided to both calibrate the linear array sensor and to process the reflectance data detected by the linear array sensor. It could be dedicated hardware like ASICs or FPGAs, software, or a combination of dedicated hardware and software. Sensors 56, 57 and 58 may also be Enhanced Toner Area Coverage (ETAC) sensors. For example, see e.g., U.S. Pat. No. 6,462,821, herein incorporated by reference in its entirety.

The reflectance of the image in the process and/or cross-process direction may be sensed using an FWA sensor, for example sensors 56, 57 and/or 58. In one embodiment, the reflectance uniformity profile of an image is measured by the sensors. Sensors 56, 57 and/or 58 may sense the different colors in the reflectance of the image.

Figure 3A:
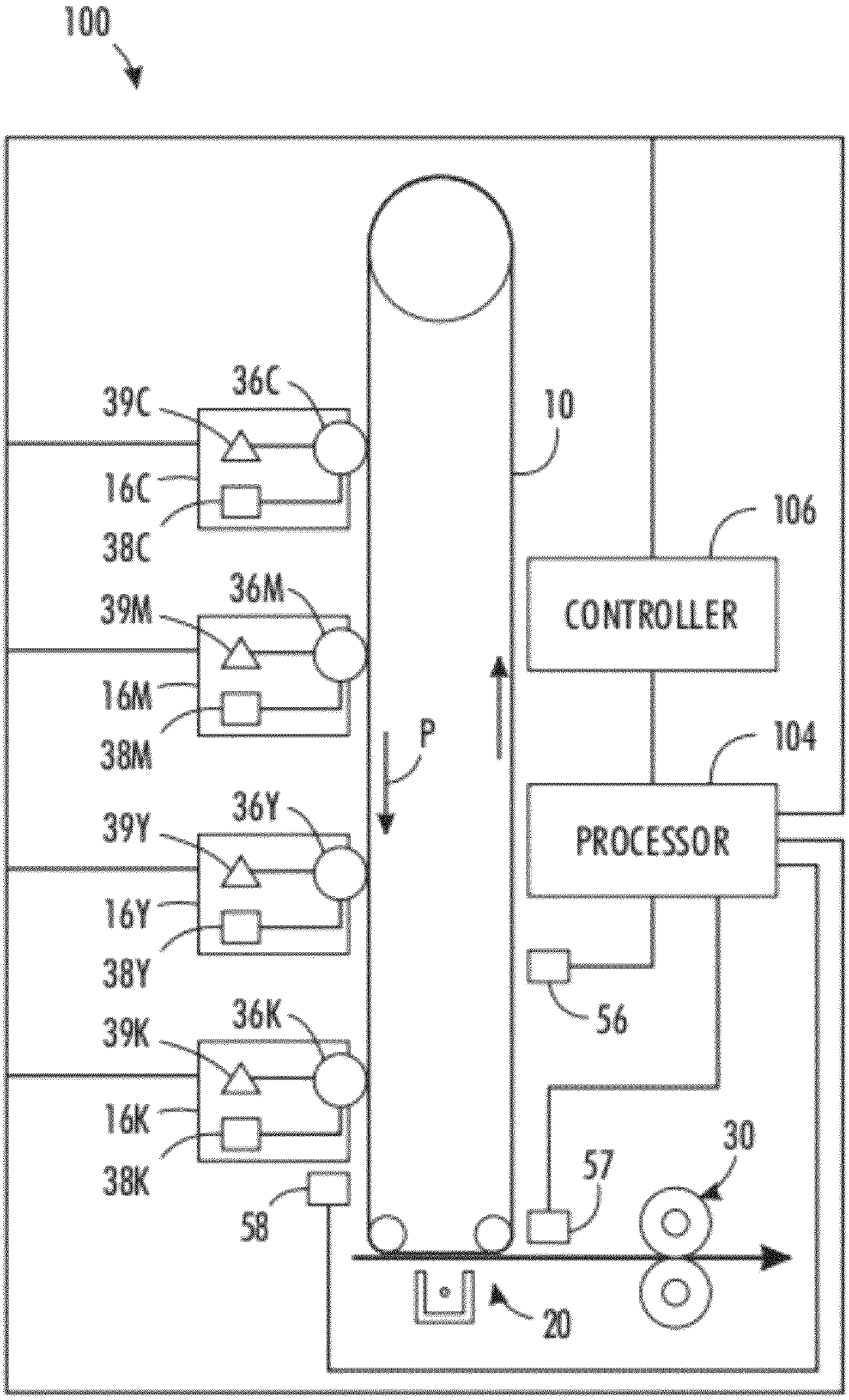
FIG. 3A illustrates a schematic perspective view of an image printing system incorporating a system for synchronizing variations in rotating developers.

In an embodiment as shown in FIG. 3A, developer units 16C, 16M, 16Y, 16K contain one or more rotating developers 36C, 36M, 36Y, and 36K. Developer units 16C, 16M, 16Y, 16K each contain a driving unit 38C, 38M, 38Y and 38K (collectively referred to as 38), respectively, configured to rotate the rotating developer 36C, 36M, 36Y, and 36K to a predetermined position or at a predetermined rotational velocity. Driving units 38 may include a motor control apparatus or system. For example, see U.S. Pat. No. 3,818,297, herein incorporated by reference in its entirety. Developer units 16C, 16M, 16Y, 16K also each contain an encoder 39C, 39M, 39Y and 39K (collectively referred to as 39) to measure positions, or phases, of rotating developers 36C, 36M, 36Y and 36K. The encoders 39 may be either dual channel encoders or single channel, as described in U.S. Pat. No. 5,206,645, herein incorporated by reference in its entirety. Other encoders are also contemplated. In one embodiment, the encoders 39 may be calibrated in accordance to the method and apparatus disclosed in U.S. Pat. No. 5,138,564, herein incorporated by reference in its entirety.

As noted above for FIG. 2, the processor 104 receives the reflectance of the image in the process and/or cross-process direction sensed by sensors 56, 57, and 58. The processor may also receive color data, including data relating to color differences from sensors 56, 57, and 58. The processor 104 may be configured to process color data, such as determining hue, lightness, and/or chroma variations along the process and/or cross-process direction. For example, see U.S. Pat. No. 6,567,170, herein incorporated by reference in its entirety. The processor also receives rotating developer position data from encoders 39C, 39M, 39Y and 39K. The processor 104 generates a reflectance profile data and sends the data to the controller 106.

Figure 4:
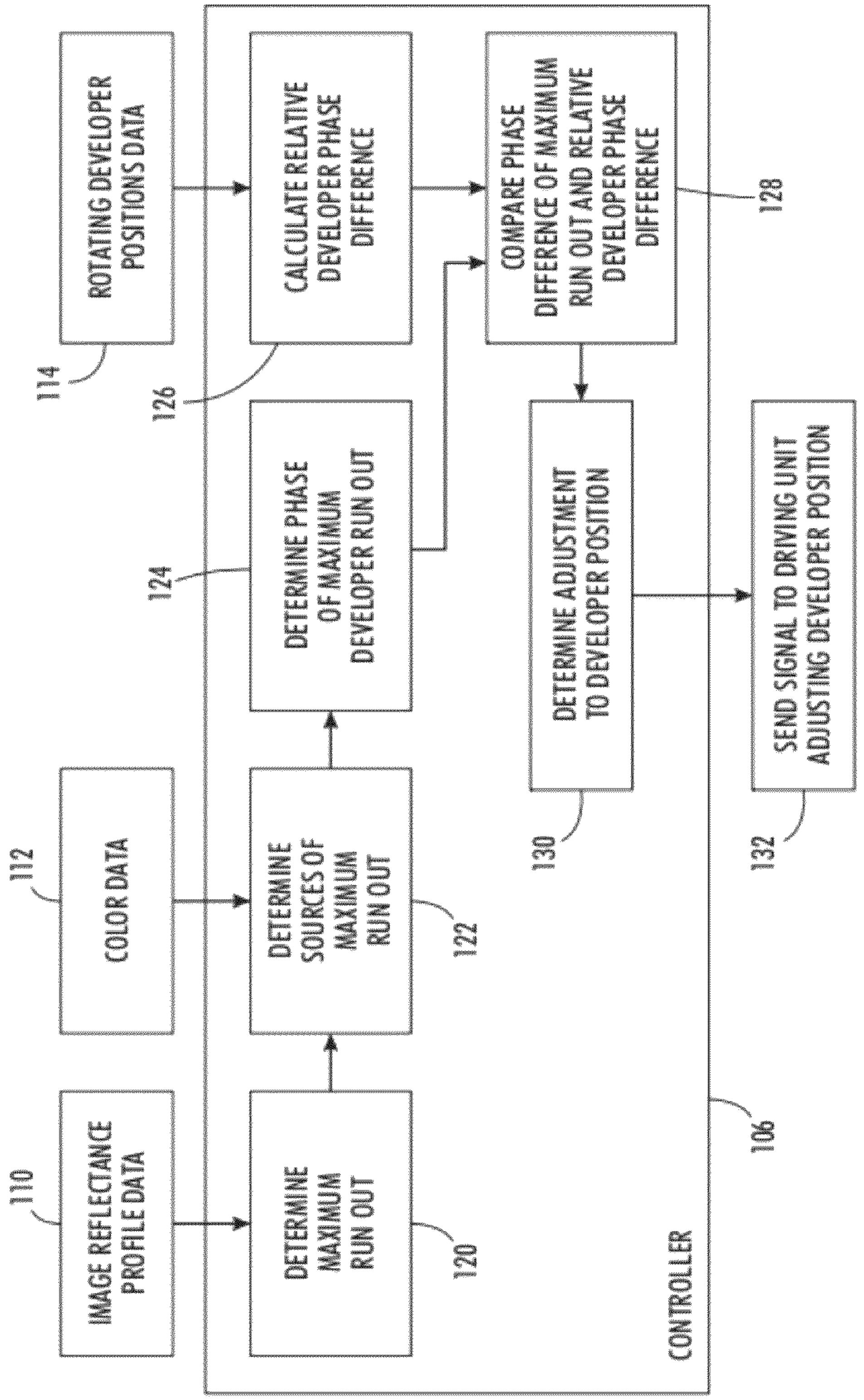
FIG. 4 illustrates a schematic view of the process implemented by a controller to synchronize variation in components or subsystems.

In an embodiment shown in FIG. 4, the controller 106 is configured to receive image reflectance profile data 110, color data 112, and rotating developer positions data 114. The controller 106 is then configured to determine maximum developer run outs in process step 120 for different rotating developers. Developer run out may be defined as a variation in the diameter of the rotating developer. For a rotating developer exhibiting multiple run outs, the maximum developer run out is the predominant variation. The maximum developer run outs can correlate to the minimum reflectance levels of the image reflectance profile. In one embodiment, the controller 106 may be configured to include a system or execute a method for determining run out and/or banding as disclosed in U.S. Pat. Nos. 7,058,325 and 7,054,568, and U.S. Patent Application Pub. No. 2007/0052991, each of which herein is incorporated by reference in its entirety. When the controller 106 determines the minimum reflectance levels, the controller 106 in step 122 is configured to determine from the color data 112 which of rotating developers 36C, 36M, 36Y, and 36K are the sources of maximum developer run outs. The controller 106 is configured in process step 124 to determine developer position(s), or phase(s), of maximum developer run outs. In one embodiment, the controller 106 may be configured to include a system or execute a method for determining the phases of maximum developer run outs as disclosed in U.S. Patent Application Pub. Nos. 2009/0002724 and 2007/0236747, each of which herein is incorporated by reference in its entirety. The phase(s) on rotating developers 36C, 36M, 36Y and/or 36K may be measured in terms of encoder pulses between the index (once around) pulse and the pulse value at the minimum reflectance level. Controller 106 is configured to calculate in process step 126 the relative phase difference between the rotating developers 36C, 36M, 36Y and/or 36K. Controller 106 is configured in process step 128 to compare the phase difference of maximum developer run out and the relative phase differences between the rotating developers 36C, 36M, 36Y and/or 36K. The controller 106 is then configured in process step 130 to determine the adjustment to position and/or rotational velocity for rotating developers 36C, 36M, 36Y and/or 36K. The controller 106 is then configured in process step 132 to send a signal driving units 38C, 38M, 38Y, and 38K to adjust the positions and/or rotational velocity of rotating developers 36C, 36M, 36Y and 36K such that the variations in rotating developers 36C, 36M, 36Y and 36K are synchronized the minimize the appearance of perceptible bands. See U.S. Pat. No. 3,818,297, herein incorporated by reference in its entirety, for an example of a motor control apparatus. In one embodiment, the controller 106 may employ the systems and methods, including feedback loops, similar to those disclosed in U.S. Pat. Nos. 6,121,992, 6,219,516, and 7,058,325, each of which herein is incorporated by reference in its entirety, to adjust the positions and/or rotational velocity of rotating developers 36C, 36M, 36Y, and 36K.

It should be appreciated that controller 106 may be configured to treat one rotating developer as master while other rotating developer(s) as slaves, such that only the position and/or rotational velocity of the slave rotating developers are adjusted relative to the master. For instance, the master may be the first rotating developer, but could be the rotating developer exhibiting the worst run out. The position of the master rotating developer may serve as a reference position for the controller 106 to adjust the position and/or velocity of the slave rotating developer(s). Thus, the relative phase difference between the master rotating developer and the slave rotating developer(s) may be controlled to zero. It also should be appreciated that the controller 106 can perform the above described process in the image printing system 100, for example in a calibration routine, and/or at the time of manufacture via a similar process.

Figure 1:
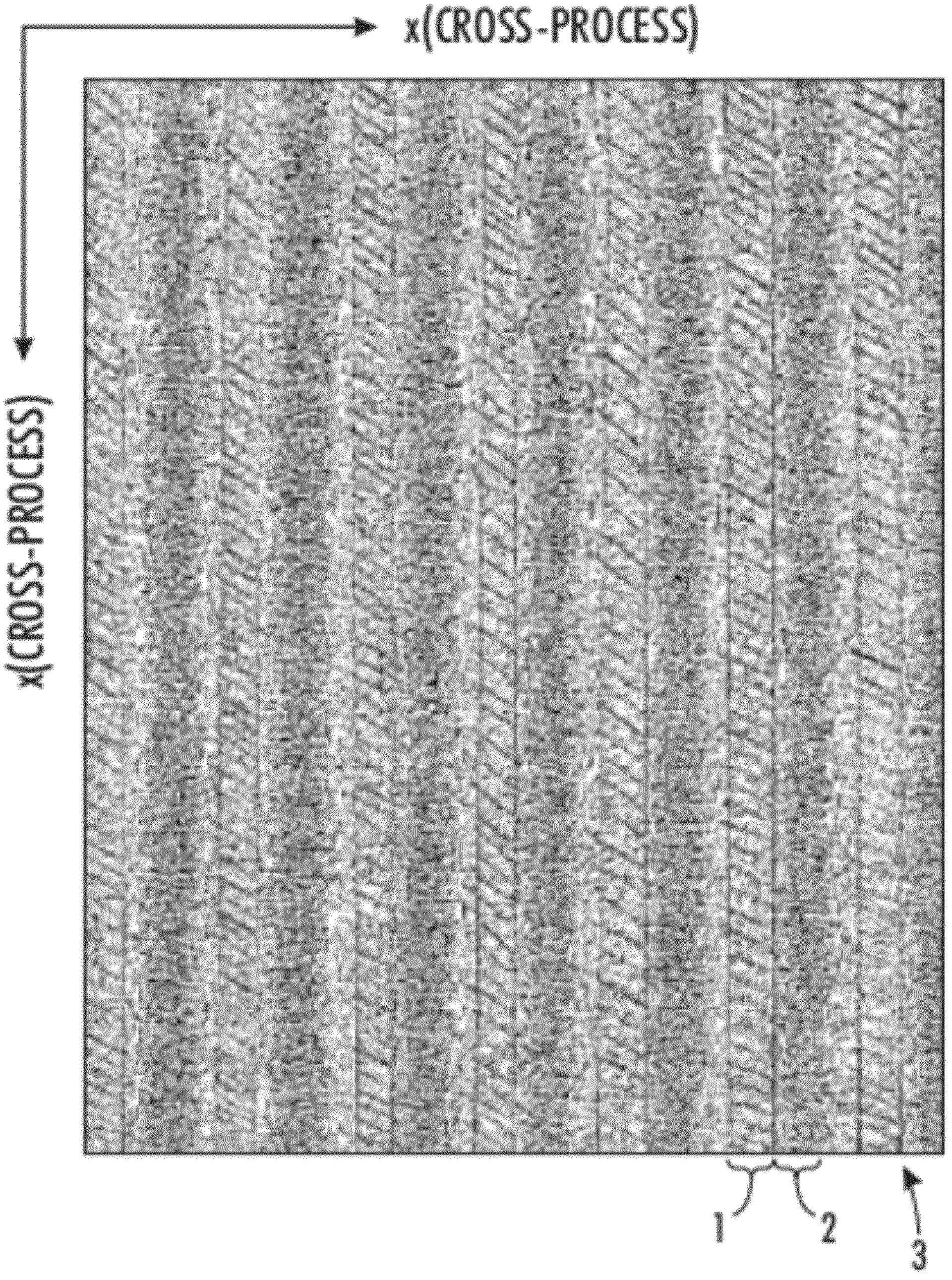
FIG. 1 illustrates exemplary bands along the process direction for a test pattern.
Figure 3B:
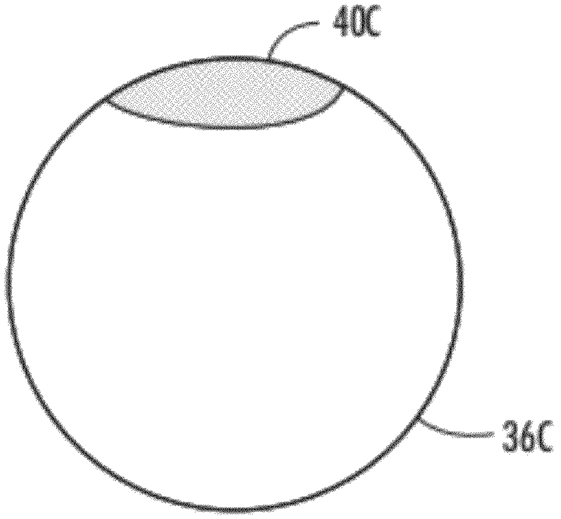
FIGS. 3B and 3C illustrate rotating developers with variations.
Figure 3C:
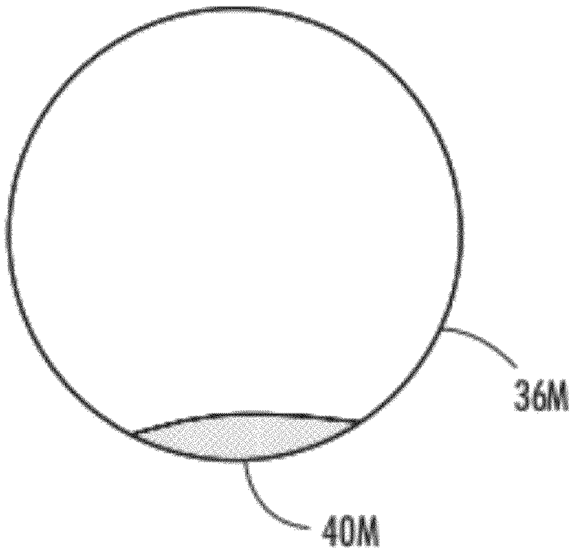

As an example, referring back to FIG. 1, two bands, band 1 and band 2, are present in an output 3. The output 3 may be a test print, such as a long uniform strip of 50% exposure of each color (e.g., C, M, Y, K). Sensors 56, 57 and/or 58 scan color images across the process direction. The color images are sent to the processor 104. The processor 104 then generates image reflectance profile data and color data based on the scanned images. The maximum developer run outs can correlate to the minimum reflectance level of the image profile for each toner color. The controller 106 then determines which developer units are the source of the bands 1 and 2. For example, controller 106 may determine that the source of band 1 is developer unit 16C and the source of band 2 is developer unit 16M. Controller 106 can then determine the phases of bands 1 and 2. Controller 106 also receives rotating developer position data from encoders 39C and 39M. Controller 106 can calculate the relative phase difference between rotating developers 36C and 36M. For example, controller 106 can determine the phases of maximum run out caused by variations, such as 40C (shown in FIG. 3B) and 40M (shown in FIG. 3C), that may be present on rotating developers 36C (shown in FIGS. 3A and 3B) and 36M (shown in FIGS. 3A and 3C), respectively. Controller 106 can then compare the phase difference of maximum developer run out and the relative phase difference of rotating developers 36C and 36M. Controller 106 can send a signal to driving unit 38M to adjust the rotating developer position and/or rotational velocity of rotating developer 36M (slave) such that variation 40M is in phase with variation 40C on rotating developer 36C (master).

Figure 5A:
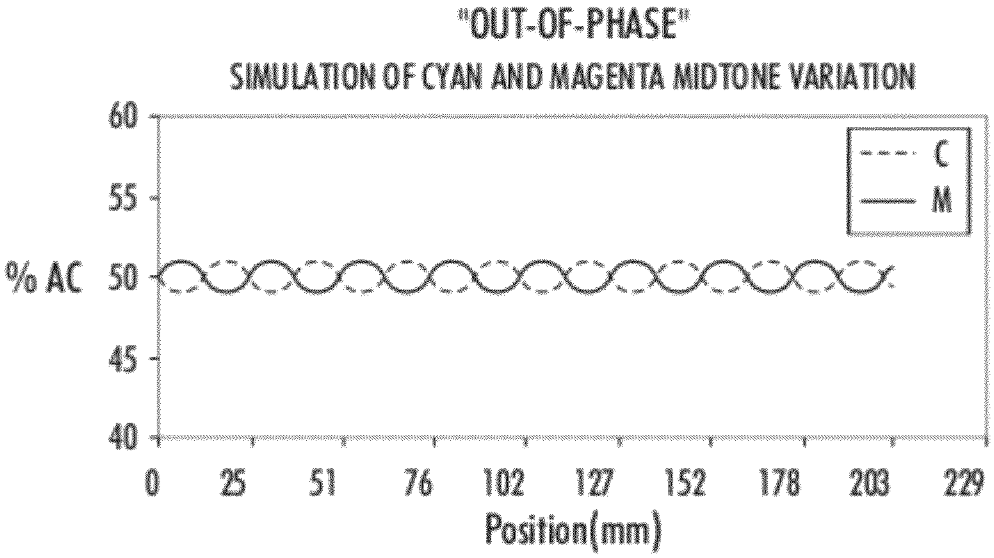
FIGS. 5A and 5B illustrate the midtone variation when cyan and magenta developer are "out-of-phase" versus "in-phase;"
Figure 5B:
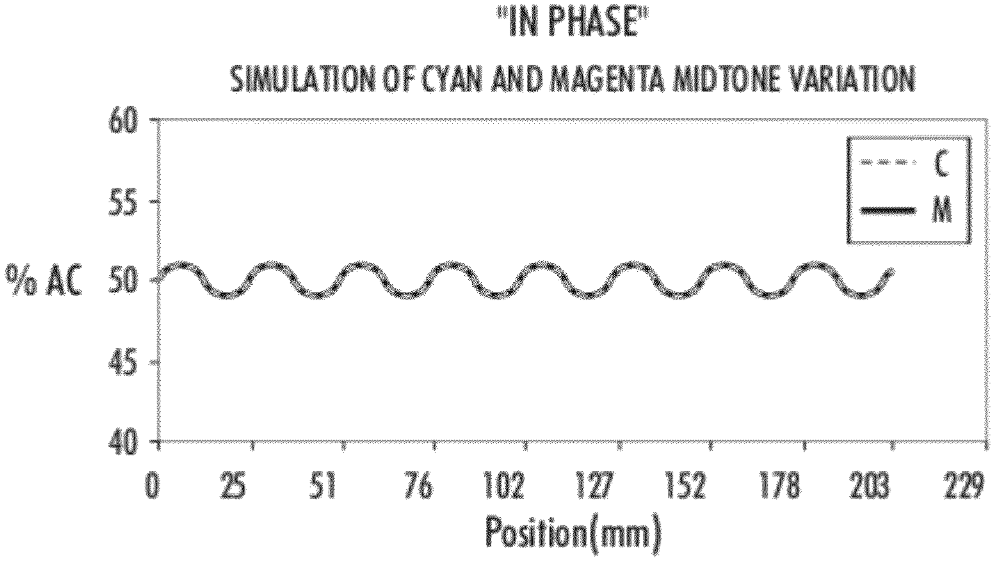

FIGS. 5A and 5B highlight the differences in midtone variation when the cyan (C) and magenta (M) rotating developers are "out of phase" versus "in phase." As shown in FIG. 5A, when C and M rotating developers are 180 degrees out of phase, the maximum and minimum midtone variations of both the C and M color separation are apparent. However, when the C and M rotating developers are in phase, as shown in FIG. 5B, only the midtone variations of either C or M is apparent. Moreover, only a single banding defect would be observed.

Synchronizing variations within components and/or subsystems may involve a tradeoff between hue variation and lightness and chroma variations. Having the rotating developers in an unsynchronized state can result in strong hue variation, but little variation in lightness and/or chroma. On the other hand, synchronizing the rotating developers decreases the hue variation, but increases lightness and chroma variations.

Figure 6A:
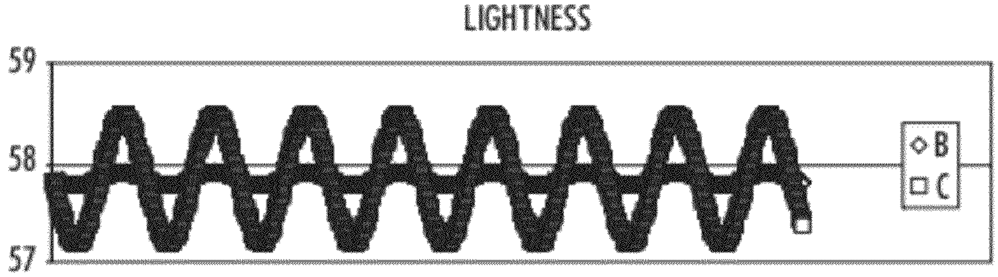
FIGS. 6A, 6B, and 6C illustrates simulation results when the rotating developers are unsynchronized, case B, versus synchronized, case C.
Figure 6B:
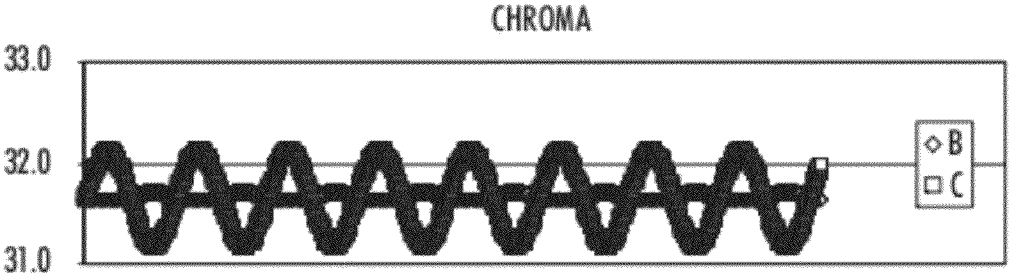
Figure 6C:
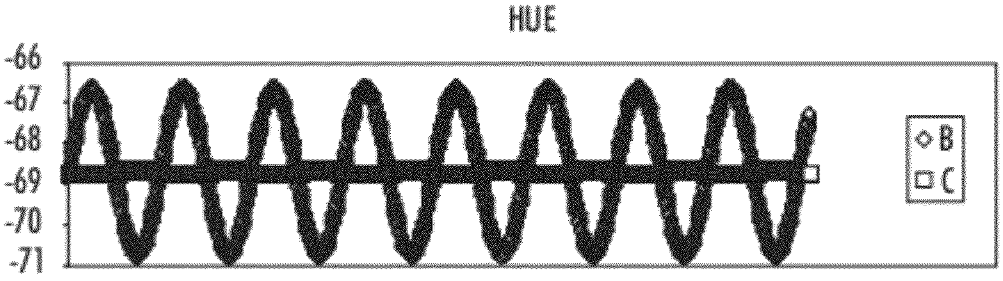

FIG. 6 illustrates simulation results when the rotating developers are unsynchronized, case B, versus synchronized, case C. Case B shows much smaller variations in lightness and chroma, but larger variations in hue compared to case C. Case C has smaller variations in hue at the expense of chroma and lightness.

Figure 7:
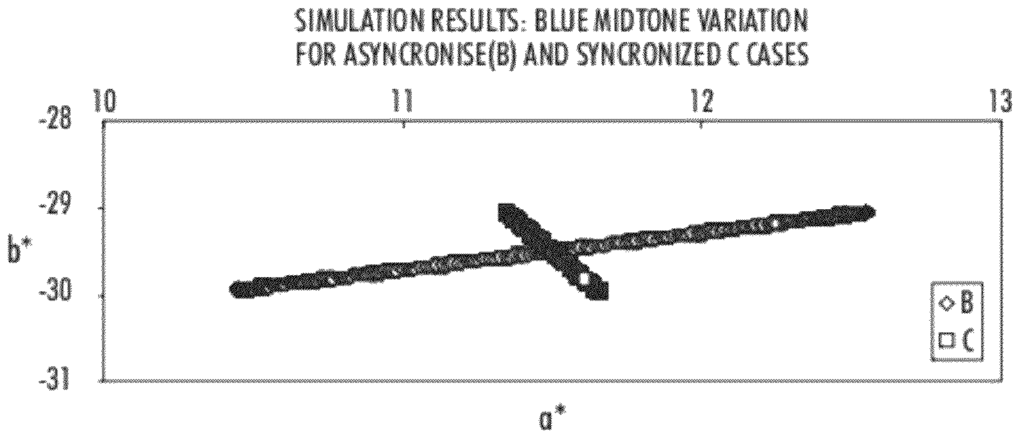
FIG. 7 illustrates the differences in blue midtone variations when the rotating developers are unsynchronized, case B, versus synchronized, case C.

FIG. 7 illustrates that when the rotating developers are synchronized, case C, there is much less blue midtone variation than when rotating developers are unsynchronized, case B.

Figure 8:
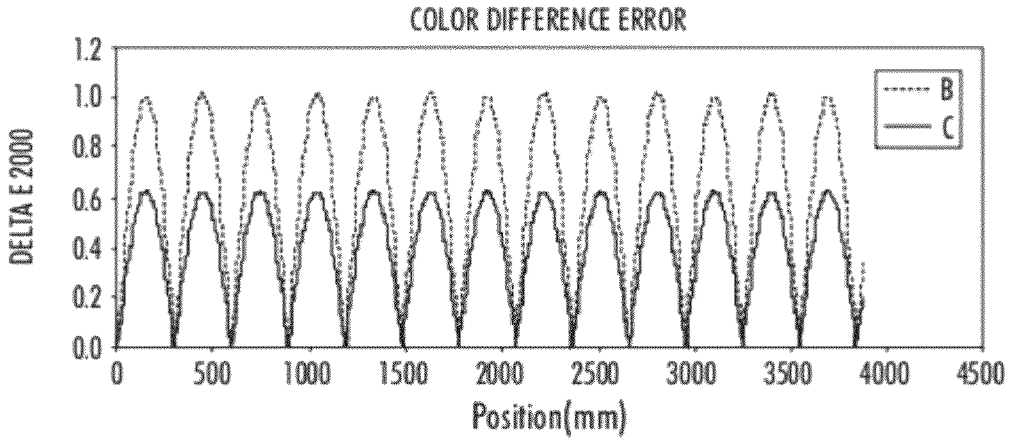
FIG. 8 illustrates a much smaller color difference error when the rotating developers are unsynchronized, case B, versus synchronized, case C.

FIG. 8 illustrates a much smaller color difference error, ΔE, for the case where the rotating developers are synchronized, case C, compared to when the rotating developers are unsynchronized, case B. Simulation results indicate a significant (40%) reduction in perceptible ΔE color difference for periodic sources of non-uniformities.

FIG. 9 illustrates another illustrative image printing system 208 incorporating another embodiment. Image printing system 208 has four ROS systems, 210, 212, 214, and 216, one for each color separation. The printing system includes a photoreceptor 218 designed to accept an integral number of spaced image areas $I_1$-$I_n$. As each of the image areas $I_1$-$I_n$ reaches a transverse line of scan, represented by lines 120*a*-120*d*, the area is progressively exposed on closely spaced transverse raster lines 222, shown with exaggerated longitudinal spacing on the image area 14. Each image area $I_1$-$I_n$ is exposed successively by ROS systems 210, 212, 214, 216. Each ROS system contains its own conventional scanning components, of which only two, the laser light source and the rotating polygon, are shown. The particular system 210 has a gas, or preferably, laser diode 210*a*, whose output is modulated by signals from controller 206 and optically processed to impinge on the facets of rotating polygon 210*b*. Each facet reflects the modulated incident laser beam as a scan line, which is focused at the photoreceptor surface. Controller 206 contains the circuit and logic modules which respond to input video data signals and other control and timing signals to operate the photoreceptor drive synchronously with the image exposure and to control the rotation of the polygon 210*b*. Controller 206 is configured to adjust the position and/or rotational velocity of rotating polygons 210*b*, 212*b*, 214*b*, and/or 216*b*. The other ROS systems 212, 214, 216, have their own associated laser diodes 112*a*, 114*a*, 116*a*, and polygons 212*b*, 214*b*, 216*b*, respectively. Further details of the embodiment may be found in U.S. Pat. No. 5,302,973, herein incorporated by reference in its entirety.

In the embodiment shown in FIG. 9, each ROS system also has a respective encoder 210*c*, 212*c*, 214*c*, and 216*c* configured to measure the position of rotating polygons 210*b*, 212*b*, 214*b*, and 216*b*. The position of each rotating polygon is transmitted to the controller 206. The encoders may be either dual channel or single channel encoders. Other encoders are also contemplated. A sensor 248 positioned along the photoreceptor downstream from the ROSs is used to detect image quality defects. It will be appreciated that the one or more sensors 248 may be placed anywhere downstream from ROS systems 210, 212, 214, 216. The sensors 248 may be FWA sensors. Sensors may include one or more spectrophotometers.

In one embodiment, image printing system 208 may employ the systems and methods disclosed in U.S. Pat. No. 7,492,381 and/or U.S. Patent Application Pub. No. 2006/0114308, each of which herein is incorporated by reference in its entirety, to detect and measure the image quality defects caused by ROS systems 210, 212, 214 and 216. Sensor 248 transmits images to processor 204. Processor 204 is configured to generate image reflectance profile data, and sends the data to controller 206. Controller 206 is configured to determine the presence and sources of image quality defects. Where the image quality defects are periodic and caused by variations on the facets of more than one of rotating polygons 210*b*, 212*b*, 214*b*, and 216*b*, such as 250 and 260 for example, the controller 206 is configured to determine position of rotating polygons 210*b*, 212*b*, 214*b*, and 216*b* at which the image quality defect is greatest, such as darkest or largest for example. The position, or phase, of rotating polygons 210*b*, 212*b*, 214*b*, and 216*b* may be measured in encoder pulse units. The controller 206, after implementing a process similar to that shown in FIG. 4, can then send a signal to rotating polygons 210*b*, 212*b*, 214*b*, and 216*b* adjusting the positions and/or rotational velocity of rotating polygons 210*b*, 212*b*, 214*b*, and 216*b*.

For example, if the controller 206 determines the presence of image quality defects in the output, the controller 206 can determine the source of the image quality defects based on the color data. Controller 206 may determine that ROS systems 210 and 212 are the source of the image quality defects. Controller 206 can then determine the phase difference of the image quality defects on the image bearing surface 218. Controller 206 also receives positions of rotating polygons 210*b* and 212*b*. Controller 206 can then determine the phase of variations 250 and 260 on rotating polygons 210*b* and 212*b*, respectively, causing the image quality defects. Controller 206 can determine the relative phase difference between rotating polygons 210*b* and 212*b*. Controller 206 can then compare the phase difference between the variations 250 and 260 and the relative phase difference between rotating polygons 210*b* and 212*b*. Controller 206 can then determine the adjustment to position and/or rotational velocity for rotating polygon 212*b* (slave). Controller 206 can send a signal to rotating polygon 212*b* adjusting the position and/or rotational velocity of rotating polygon 212*b* to synchronize the variation 260 with variation 250 on rotating polygon 210*b* (master) such that the variations are in phase. In one embodiment, the rotating polygons 210*b*, 212*b*, 214*b*, and 216*b* may be synchronized to each other, for example, by employing the method and apparatus disclosed in U.S. Pat. No. 6,121,992, herein incorporated by reference in its entirety.

Figure 10:
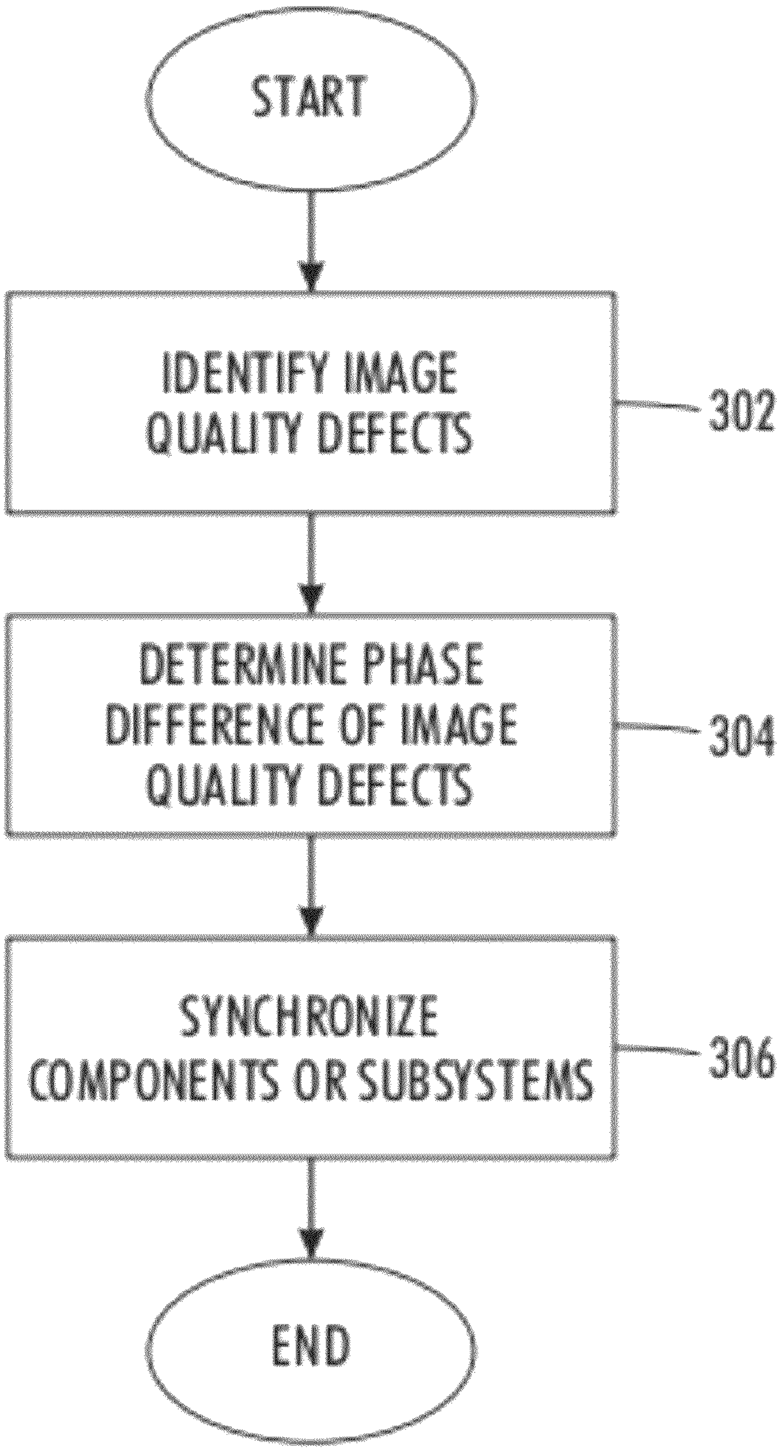
FIG. 10 illustrates a method to synchronize variation in components or subsystems.

FIG. 10 illustrates the three-step method for synchronizing variations within components and subsystems such that variations are in phase in accordance with an embodiment. In step 302, image quality defects, such as banding, are identified. In step 304, the phase difference for the image quality defects is determined. In step 305, the components or subsystems are synchronized with each other such that the variations causing image quality defects are in phase.

These embodiment may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety. In TIPP systems, each printer may have one or more developer units, ROS systems, and other components or subsystems associated with it. It should be appreciated that the embodiment described may be implemented in TIPP systems to synchronize variations in and subsystems for each printer, and among multiple printers.

Figure 11A:
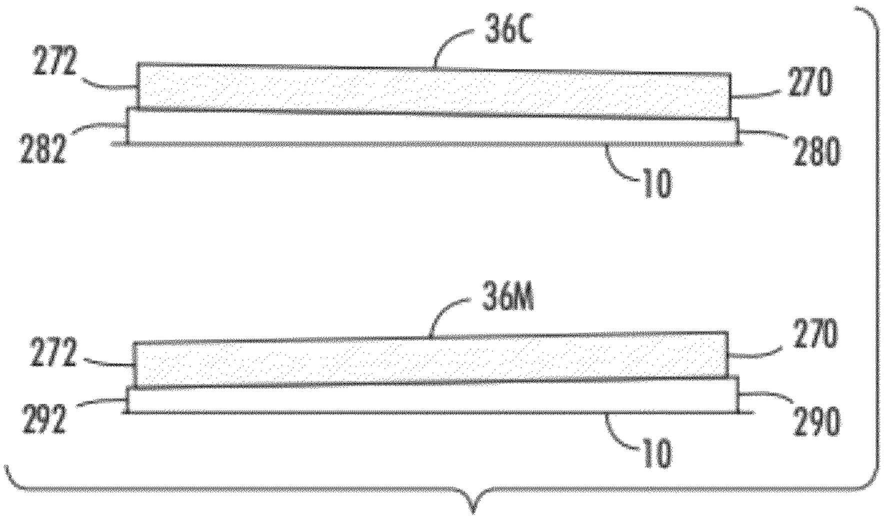
FIGS. 11A and 11B illustrate a cross-sectional front view of rotating developers relative to image bearing surface for different separations.
Figure 11B:
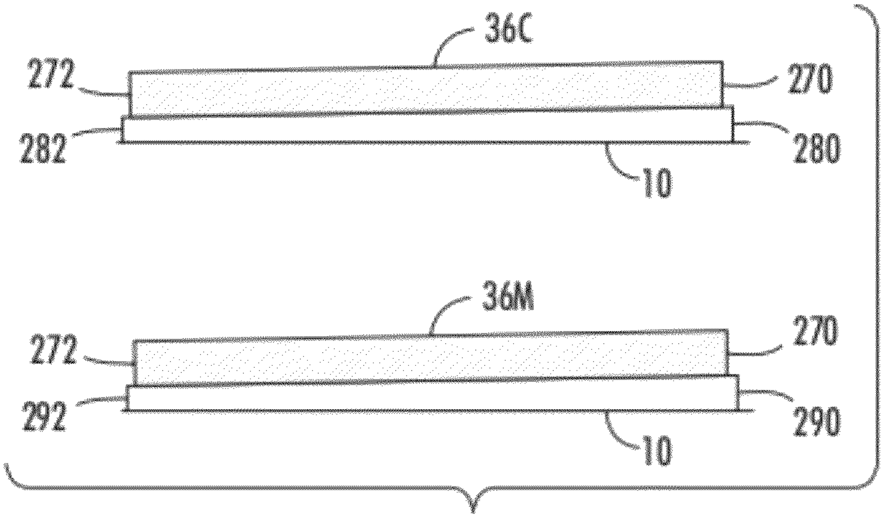

In another embodiment, rotating developers 36 may be aligned such that gaps between the rotating developers 36 and image bearing surface 10 are synchronized along the in-board and out-board sides. As shown in FIGS. 11A and 11B, the in-board side 272 and out-board side 270 are the two sides of the image bearing surface. See also FIG. 9. FIGS. 11A and 11B illustrate a cross-sectional front view of rotating developers relative to image bearing surface for different separations (i.e. cyan and magenta). For example, in FIG. 11A, rotating developer 36C is skewed such that gap 282 on the in-board side 272 is larger than gap 280 on the out-board side. On the other hand, rotating developer 36M is skewed such that gap 292 on the in-board side 272 is smaller than gap 290 on the out-board side 270. Therefore, rotating developer 36C and 36M are not synchronized along the in-board and out-board sides, resulting in significantly more objectionable image quality defects. Assuming the skew of rotating developers are within a predefined tolerance range, the two separations would be at opposite ends of the tolerance range. Thus, the separation to separation tolerance buildup may double along the inboard and outboard sides compared to the situation where rotating developers are synchronized along the in-board and out-board sides, as shown in FIG. 11B. In FIG. 11B, rotating developers 36C and 36M are synchronized along the in-board and out-board sides. Rotating developers 36C and 36M are skewed similarly such that gap 280 is larger than gap 282, and gap 290 is larger than gap 292. The alignment may be performed manually or through an automated mechanism. Rotating developers 36C and 36M also may be synchronized in accordance with one or more of the discussed embodiments.

In another embodiment (not shown), two or more charging devices, such as charge corotrons 12C, 12M, 12Y, and/or 12K (collectively referred to as 12) (shown in FIG. 2), may be aligned such that gaps between the charging devices 12 and image bearing surface 10 are synchronized along the in-board and out-board sides. For example, charge corotrons 12C and 12M may not be synchronized along the in-board and out-board sides, much like rotating developers 36C and 36M shown in FIG. 11A. Thus, in accordance with an embodiment, charge corotrons 12C and 12M may be synchronized along the in-board and out-board sides, much like rotating developers 36C and 36M shown in FIG. 11B. The alignment of charging devices 12C and 12M may be performed manually or through an automated mechanism.

It should be appreciated that if two rotating developers, such as rotating developers 36C and 36M, or charge devices, such as charge corotrons 12C and 12M, are not synchronized, a noticeable hue shift may occur in the cross-process direction. The hue shift may be tested by an automated process, such as by printing a test pattern, and measuring and analyzing the test pattern. The test pattern may be measured by one or more sensors, such as sensor 56, 57, and/or 58 (shown in FIGS. 2 and 3A) for example. Processor 104 (shown in FIGS. 2 and 3A) may analyze the data received from one or more sensors 56, 57, and/or 58 to determine shifts in hues.

It should be appreciated that the present disclosure is applicable to various components and subsystems in an image printing system, including various rotating developers and/or drums, including photoreceptor drums, ROS systems, and the like. It also should be appreciated that the present disclosure is applicable to both image printing systems employing image-on-image (IOI) and intermediate belt transfer (IBT) xerography. See U.S. Pat. Nos. 7,177,585 and 6,904,255, each of which herein is incorporated by reference in its entirety, for information about IOI and IBT xerography.

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What we claim is:

1. A method for synchronizing variations in components or subsystems in an image printing system, the method comprising:

receiving, by a controller, image reflectance profile data and color data of an image formed on an image bearing surface of the image printing system;

identifying, by the controller, a plurality of image quality defects printed by the image printing system using the received image reflectance profile data, said image quality defects each occurring with an associated frequency and each being associated with at least a component or subsystem of the image printing system;

identifying, by the controller, each component or subsystem associated with the image quality defects using the received color data;

determining a phase difference of the image quality defects by the controller; and adjusting operation of each component or subsystem associated with the image quality defects, such that the image quality defects are in phase.

2. The method according to claim 1, wherein each component or subsystem comprises one or more rotating units.

3. The method according to claim 2, wherein the one or more rotating units are rotating developers.

4. The method according to claim 3, wherein the image quality defects are caused by variations in the diameter of the rotating developer.

5. The method according to claim 1, further comprising identifying a predominant variation in each components or subsystem.

6. The method according to claim 5, wherein the predominant variation is characterized as a maximum rotating developer run out.

7. The method according to claim 6, wherein the maximum rotating developer run out is a variation in the diameter of a rotating developer.

8. The method according to claim 1, wherein the subsystems are Rasterizing Output Scanner (ROS) systems comprising a rotating polygon.

9. The method according to claim 8, wherein the image quality defects are caused by variations on the facets of more than one rotating polygon.

10. The method of claim 1, wherein the controller receives the image reflectance profile data from a processor.

11. The method of claim 1, wherein each component or subsystem is located in one or more machines in a tightly integrated parallel printing system.

12. The method according to claim 1, further comprising receiving positional data of each component and/or the subsystem so as to determine the phase difference of the image quality defects.

13. The method according to claim 1, wherein the adjusting the operation of each component or subsystem may include adjusting the position and/or rotational velocity of each component or subsystem.

14. The method according to claim 1, wherein the image quality defects are periodic defects on the image caused by a one-dimensional density variation in a process or a slow scan direction of the image printing system.

15. A method for synchronizing variations in components or subsystems in an image printing system, the method comprising:

identifying a plurality of image quality defects printed by the image printing system by a controller, said image quality defects each occurring with an associated frequency and each being associated with a component or subsystem of the image printing system;

determining a phase difference of the image quality defects by the controller;

adjusting operation of each component or subsystem associated with the image quality defects, such that image quality defects are in phase, and aligning variations along in-board and/or out-board positions in the image printing system.

16. A system for synchronizing variation in components or subsystems in an image printing system, the system comprising:

an image bearing surface;

a marking engine configured to generate an image to be formed on the image bearing surface;

a sensor configured to sense images on the image bearing surface to obtain image reflectance profile data and color data; and a controller, wherein the controller is configured to:

identify a plurality of image quality defects printed by the image printing system using the received image reflectance profile data, said image quality defects each occurring with an associated frequency and each being associated with at least a component or subsystem of the image printing system;

identify each component or subsystem associated with the image quality defects using the received color data;

determine a phase difference of the image quality defects; and adjust operation of each component or subsystem associated with the image quality defects, such that the image quality defects are in phase.

17. The system according to claim 16, wherein each component or subsystem comprises one or more rotating units.

18. The system according to claim 17, wherein the rotating units are rotating polygons of Rasterizing Output Scanner (ROS) systems.

19. The system according to claim 18, wherein the image quality defects are caused by variations on the facets of more than one rotating polygon.

20. The system according to claim 17, wherein the rotating units are rotating developers.

21. The method according to claim 16, wherein the controller is further configured to identify a predominant variation in components or subsystems.

22. The system according to claim 21, wherein the predominant variation is characterized as a maximum rotating developer run out.

23. The system of claim 16, wherein the controller is configured to receive the image reflectance profile data from a processor.

24. The system of claim 16, wherein each component or subsystem is located in one or more machines in a tightly integrated parallel printing system.

25. A system for synchronizing variation in components or subsystems in an image printing system, the system comprising:

an image bearing surface;

a marking engine configured to generate an image to be formed on the image bearing surface;

a sensor configured to sense images on the image bearing surface; and a controller, wherein the controller is configured to:

identify a plurality of image quality defects printed by the image printing system by a controller, said image quality defects each occurring with an associated frequency and each being associated with a component or subsystem of the image printing system;

determine a phase difference of the image quality defects by the controller; and adjust operation of each component or subsystem associated with the image quality defects, such that image quality defects are in phase, wherein the controller is further configured to align variations along in-board and/or out-board positions in the image printing system.

* * * * *